F. A. BRUCKMAN.
BOXING MECHANISM FOR ICE CREAM CONE MACHINES.
APPLICATION FILED JUNE 20, 1917. RENEWED SEPT. 28, 1918.
1,302,893.
Patented May 6, 1919.
4 SHEETS—SHEET 1.
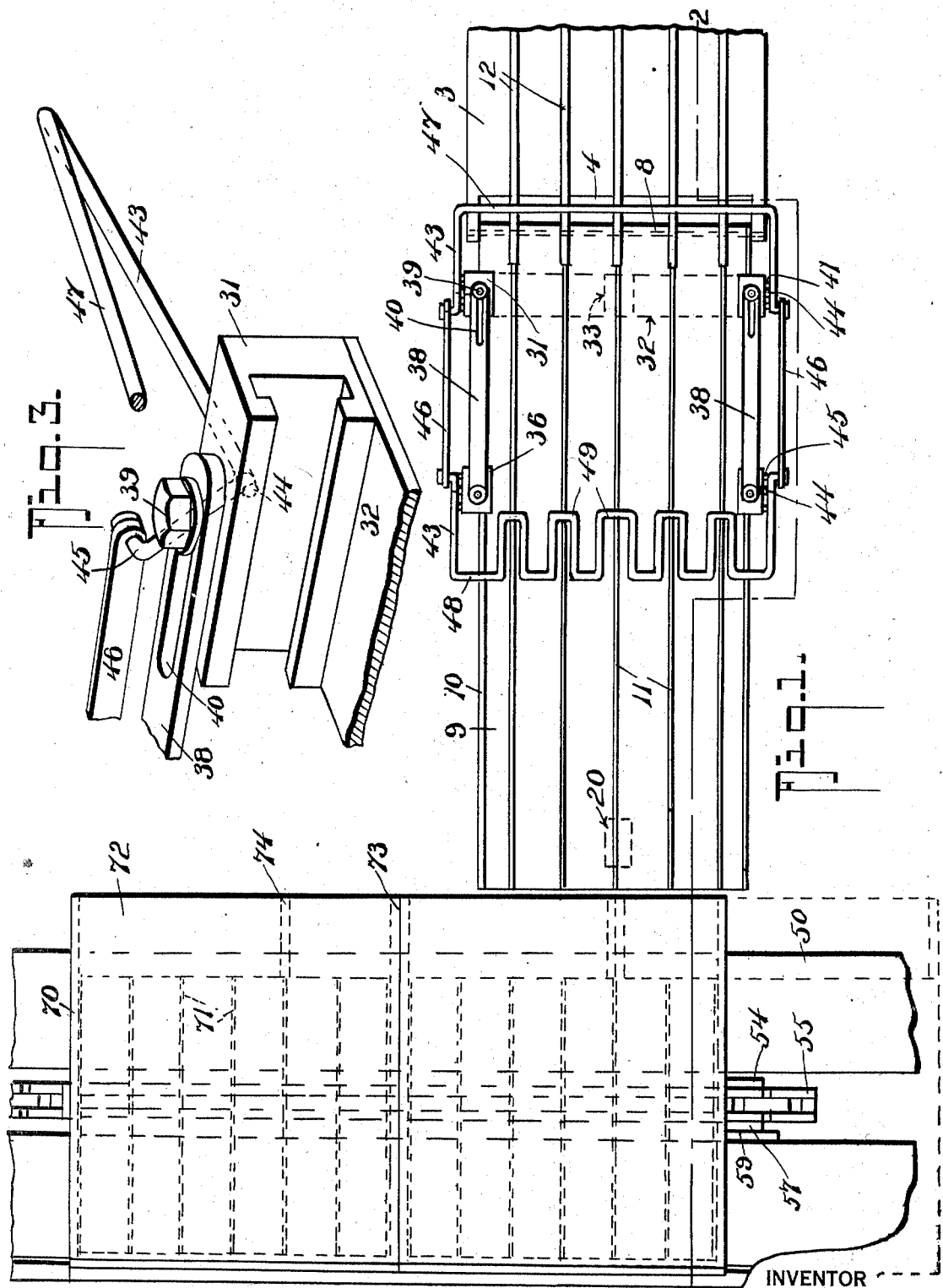
INVENTOR
F. A. Bruckman
BY
Fred G. Dieterich
ATTORNEYS

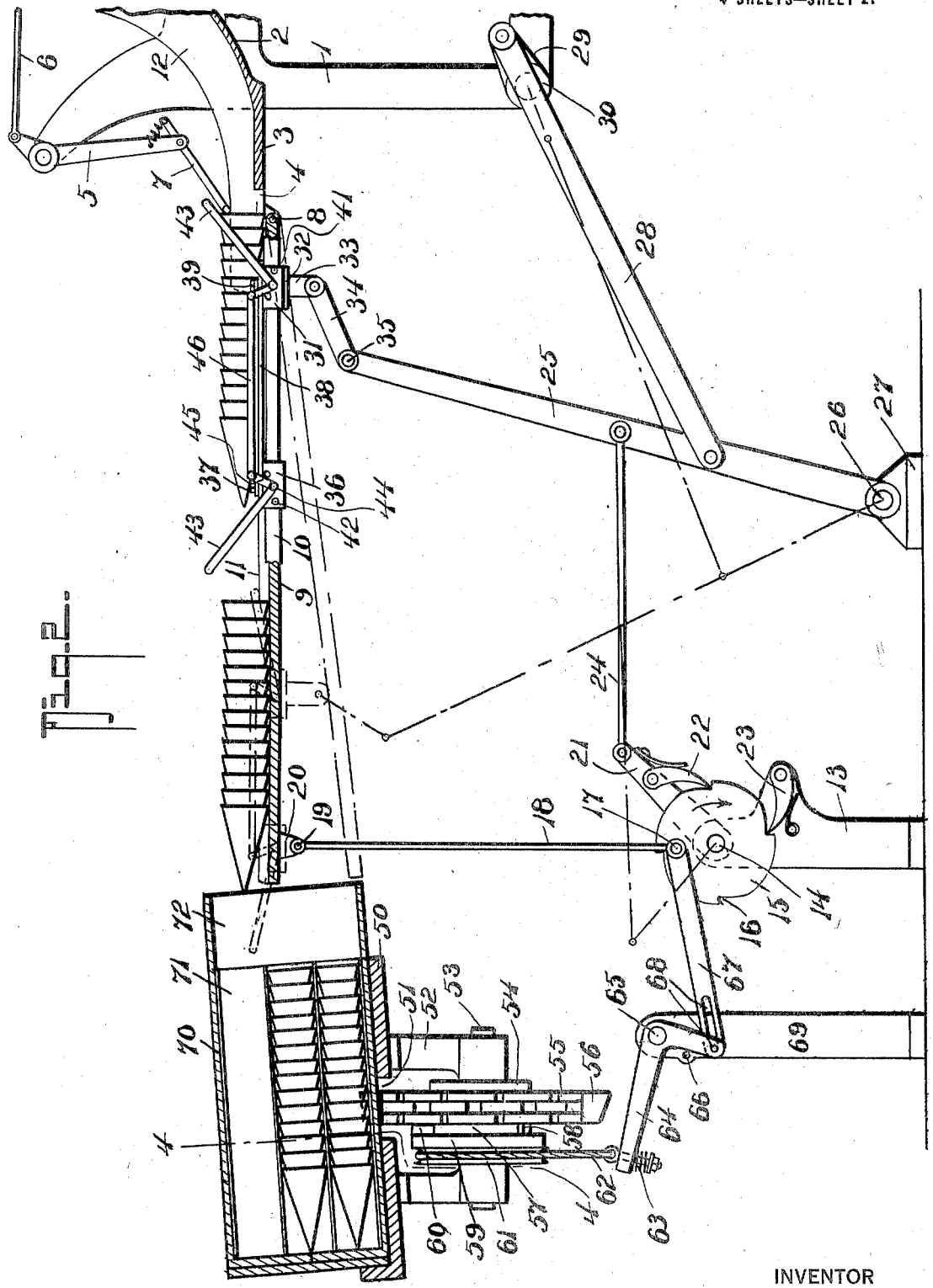

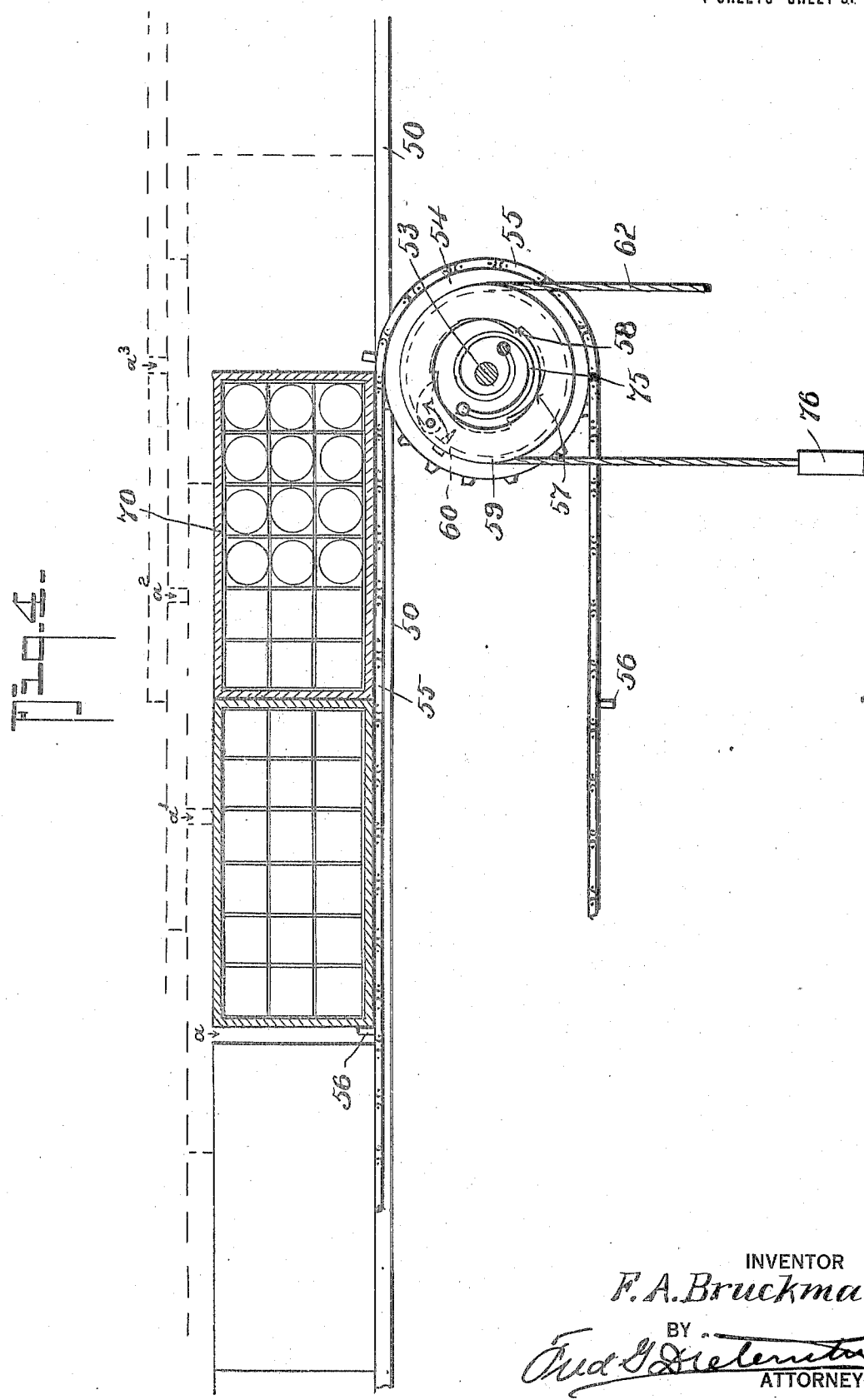

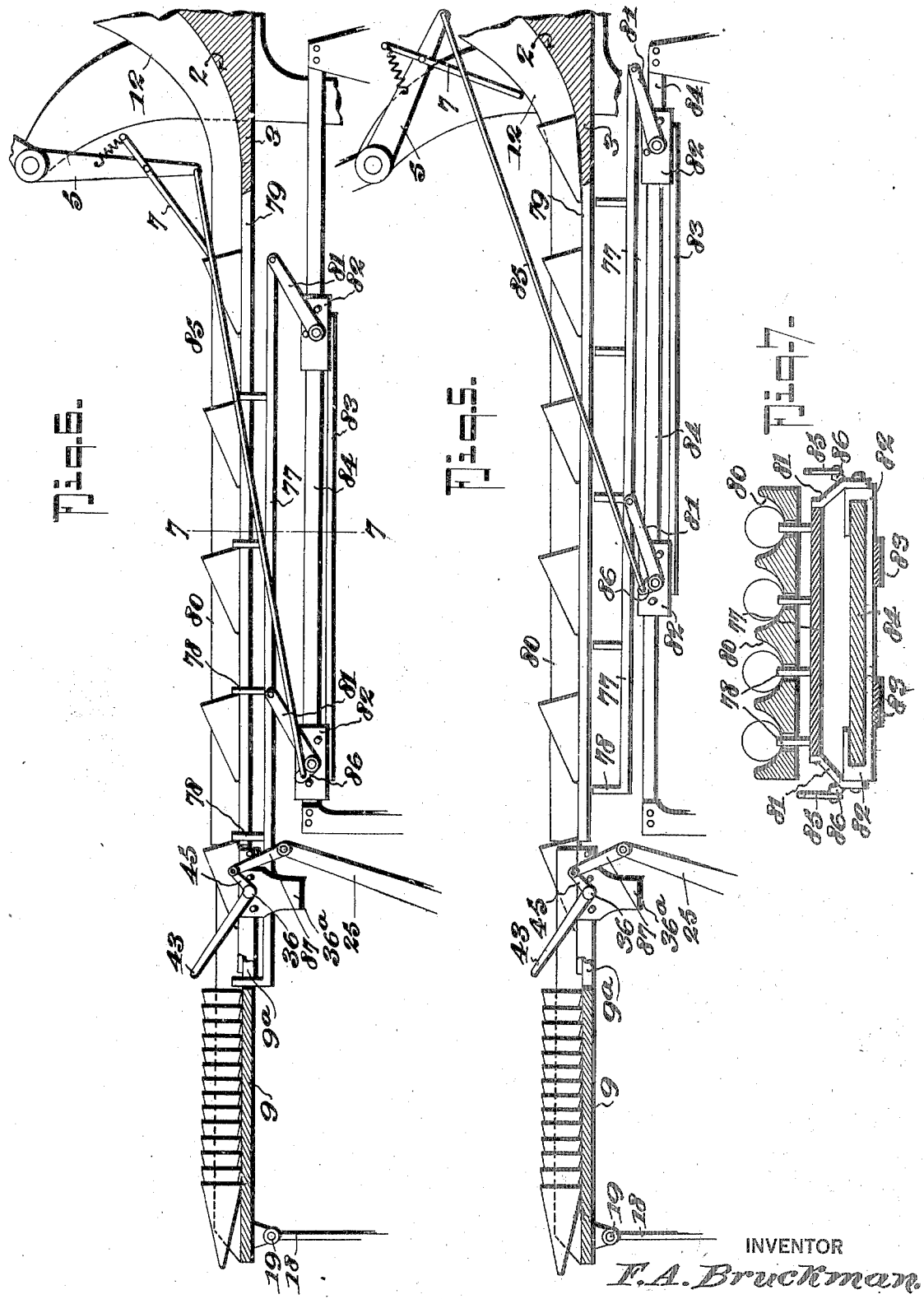

UNITED STATES PATENT OFFICE.

FREDERICK A. BRUCKMAN, OF PORTLAND, OREGON.

BOXING MECHANISM FOR ICE-CREAM-CONE MACHINES.

1,302,893. Specification of Letters Patent. Patented May 6, 1919.

Application filed June 20, 1917, Serial No. 175,857. Renewed September 28, 1918 Serial No. 256,146.

*To all whom it may concern:*

Be it known that I, FREDERICK A. BRUCKMAN, a citizen of the United States, residing at Portland, in the county of Multnomah and State of Oregon, have invented certain new and useful Improvements in Boxing Mechanism for Ice-Cream-Cone Machines, of which the following is a specification.

My invention relates to certain new and useful improvements in mechanism for putting the baked product of pastry molding and baking machines (especially ice cream cone making machines) into boxes or cartons and the invention is especially designed for use in connection with cone making machines of the Bruckman type, see Letters Patent No. 1,071,027, issued August 26, 1913.

In machines of the Bruckman type, the cones after leaving the trimming mechanism are conveyed onto a table where they are usually taken by the attendent in "sticks" and inserted into the boxes. The present invention primarily has for its object to eliminate handling of the cones by the attendant and to enable the cones to be put into boxes without being touched. In this way, I am enabled to manufacture ice cream cones without handling the same at any stage of the proceedings, so by use of the Bruckman machine with the automatic boxer of the present application, the cones will not be touched by the operator's hand during any stage of their manufacture.

In the Bruckman machines, batter is placed into a reservoir and is automatically fed to the molding and baking devices from which the cones are automatically discharged and pass into a trimming device by which they are trimmed before finally leaving the machine and being conveyed onto the receiving table.

My device is designed to take the cones as they come on the receiving table and after having been made up in "sticks" of predetermined lengths (each stick containing a definite number of cones), the sticks are put into the proper cell of the box or carton, so that all the operator need do is to seal the box after it has been filled.

In carrying out my invention, I provide the receiving table with a device for raising and lowering the discharge end of the same to line up with the several tiers of cells in the boxes, so that after one tier has been filled, the table will be self-adjusted into position whereby the next set of cones will be put into the proper tier above and so on, the boxes being carried by a transverse conveyer along the table with the open ends of the boxes adjacent to the discharge end of the receiving table on which the cones are put as they leave the trimming mechanism.

The invention also includes those novel features of construction, combination and arrangement of parts, all of which will be first fully described and then be specifically pointed out in the appended claims, reference being had to the acompanying drawings, in which:

Figure 1 is a top plan view of the invention.

Fig. 2 is a section on substantially the line 2—2 on Fig. 1.

Fig. 3 is a detail perspective view of one of the slide members which carries the conveyer loop member.

Fig. 4 is a diagrammatic detail section on the line 4—4 on Fig. 2, looking from left to right in Fig. 2, and showing a mechanism for advancing the boxes step by step into proper position with relation to the cone receiving table.

Fig. 5 is a longitudinal section, largely diagrammatic, showing a means for separately delivering cones before stacking them, the parts being in the retracted position.

Fig. 6 is a view similar to Fig. 5 showing the parts in the advance position.

Fig. 7 is a detail cross section on the line 7—7 of Fig. 6.

In the drawings in which like numerals of reference indicate like parts in all of the figures, 1 represents a portion of the frame of the ice cream cone machine to which my invention is applied and 2 indicates the offtake chute from the trimmer.

In using my present invention, I prefer to stack the cones in sticks by means of an oscillating arm 5 operated by a rod 6 from a suitable oscillating part of the cone machine, the arm 5 carrying a finger 7 which is designed to engage the cone as it drops into the chute 2 and push it into the preceding cone; whereby a stick of cones is formed on the table.

3 is the step at the bottom of the chute 2 from which the cones pass onto the hinged table 9, the table 9 being hinged at 8 and spaced from the step 3 as at 4 to allow the trimmings to fall through. The table 9 is provided with four grooves 11, one corresponding to each section of the chute 2, the chute 2 being divided into sections by partitions 12, so that each set of cones may fall into the respective section intended for it.

The longitudinal edges of the table 9 have T-plates 10 on which the blocks 31 and 36 are slidable for a purpose presently explained.

13 is a support in which a shaft 14 is mounted and on which shaft a ratchet 15 is located, the ratchet 15 having a predetermined number of teeth or notches 16 (four in the present case), the purpose of which is to engage with the pawl 22 on the rocking arm 21 and with the check pawl 23 on the support 13.

17 is a wrist pin on the ratchet disk 15 which is connected with the table 9 by a connecting rod 18 that is pivoted at 19 to a bracket 20 behind the front or free end of the table 9, so that as the ratchet disk 15 is turned to bring the wrist pin 17 from its lowest position to its highest position, the table 9 will be raised from the dotted line position in Fig. 2 to the full line position and will rest at each of the positions indicated in Fig. 2 and also at an intermediate position so as to aline the table with the respective cells 71 of the box or carton 70.

The ratchet lever 21 is operated by a connecting rod 24 which joins it with a rocking lever 25 that is fulcrumed at 26 to a base support 27 and is itself operated through a connecting rod 28 by a crank 29 on a shaft 30 that has continuous rotary motion imparted to it by some moving part of the cone making machine (not shown).

The blocks 31 on opposite sides of the table 9 are connected together by a cross bar 32 which has a bracket 33, by means of which it is linked as at 34 with the lever 25, the link 34 being pivotally connected at 35 with the lever 25 and bracket 33 respectively.

36 are front blocks slidable on the T-bars 10 and to which at 37 the connecting bars or rods 38 are firmly secured, the rods 38 connect the blocks 36 with the blocks 31 and have a loose connection at 39 with the blocks 31, there being slots 40 provided whereby limited movement of the blocks 31 and 36 toward and from one another may be obtained.

Pivoted to the blocks 31 at 44 are arms 43 having connecting cross bars 47, see Figs. 1 and 3, the arms 43 having extensions 45 to which the connecting rods 46 are pivoted. The blocks 36 are also provided with arms 43 whose extensions 45 are connected with the connecting rods 46 so that the front and back members 43 may be operated together to raise or lower the same.

41 designate stop pins on the blocks 31 and 42 designate stop pins on the block 36 to limit the movements of the arms 43 downwardly.

The arms 43 on the front blocks 36 are connected together by an undulated cross bar 48, the bar 48 being looped at 49, see Fig. 1, so as to straddle the edges 73 of the box when the arms 43 are pushing the cone sticks into the box cells.

50 is the transverse table along which the boxes are fed by the conveyer 55. The conveyer 55 is an endless chain having pushers 56 which project upwardly above the plane of the table 50 and are designed to shove the boxes along.

The table 56 is slotted longitudinally at 51 for the purpose of permitting the conveyer to project up into working relation to the boxes.

52 indicates brackets for supporting the shaft 53 on which the conveyer sprocket 54 is mounted. The sprocket 54 carries a ratchet 57 having notches 58 arranged at definite intervals, whereby the proper advance of the conveyer in step by step movement can be obtained through the medium of a pawl 60 that is mounted on a pawl carrier 59, the carrier 59 having a peripheral groove 61 in which the pull cable 62 lies, the cable 62 having one end fastened in any suitable way to the pawl carrier 59. The other end of the cable 62 is connected by a yieldable connection 63 with the long arm of a bell crank 64, the latter being fulcrumed at 65 to a post 69 and having its movement in one direction limited by a stop 66, the movement in that direction being effected by a spring 75 located within the pawl carrier 59 and secured at one end to the pawl carrier and at the other end to one of the brackets 52 or the cable 62 may be extended downwardly, as indicated in Fig. 4, and counterweighted as at 76 or both the spring and counterweight structures may be employed, as desired.

The bell crank 64 is moved to pull the cable 62 downwardly to advance the box conveyer, by a connecting rod 67 which joins the bell crank 64 with the wrist pin 17, the connection between the bell crank and rod 67 having a pin and slot connection 68 so that the bell crank 64 will be operated only while the pin 17 is passed from the position shown in Fig. 2 down to the bottom limit of its movement as the advance of the boxes is made only once for every three tiers of cells filled.

The boxes which are used for containing the cones have their open flaps 72 directed toward the table 9 and the boxes contain cells 71 to keep the adjacent sticks of cones separated.

In operation, as soon as a stick of cones has been formed adjacent to the receiving ends of the table 9, the crank 29 will begin to throw the lever 25 from the full line position of Fig. 2 toward the dot and dash line position. On commencement of this movement, the blocks 31 are advanced but owing to the slots 40, the blocks 36 remain stationary until the cap screw 39 reaches the forward end of the slot 40. During this movement, the arms 43 will be rocked downwardly so that the front arm 43 will engage a preceding stick (if such be present) to push it into the box cell while the rearward arm 43 will move the right hand stick over the position of the left hand stick, after which on the recessional movement of the lever 25, the arms 43 are raised to clear the front stick and returned to the full line position, during which time another stick of cones is being made up at the right in Fig. 2.

The slot 40 permits the rear rod 43 to be lowered and upon continuing the forward movement of the slide 31 the forward rod 43 is lowered. Upon return movement of the slide 31, the rear rod 43 is lifted, due to the lost motion connection at 40, and immediately thereafter the forward rod 43 is raised.

The table 9 will not stop at the intermediate position while being lowered, for the reason that the notches of the disk 16 are so proportioned that on the final stroke of the rod 24, from the dot and dash line position shown in Fig. 2, wrist pin 17 will pass below the center 14 and the weight of the table 9 together with the tension of the spring 75 and the action of the weight 76 will insure the movement of the table to its lowermost limit.

While the right hand stick of cones is being made up, the attendant has sufficient time to inspect the left hand stick in Fig. 2 and enable him to replace a damaged or imperfect cone before the stick is pushed into the box.

As the Bruckman machines are made to deliver four cones at a time, four transverse cells of the boxes can only be filled at one time but, as the boxes used contain six cells, it is necessary to fill first the right hand four tiers, see Fig. 4, then the left hand two of the advanced box and the right hand two of the following box, after which the last four sets of the following box are moved into position to be filled, the advancing occurring as indicated by $a$, $a^1$, $a^2$, $a^3$, (diagrammatically) in Fig. 4.

In order that the boxes may have sufficient space between them for the pushers 56 to enter, it is necessary to give the conveyer 55 a step by step movement, consisting of two equal steps of definite degree, $a^1$ $a^2$, and then a third step of a slightly greater degree, $a^3$, so that the three steps or movements to each revolution of the gear 54 will not be equal. This is accomplished by spacing the ratchet recesses 58 in such manner that on two of the movements, the dog 60 will have a certain amount of lost motion before engaging the shoulder, whereas on the third movement, the dog engages the shoulder immediately the dog begins to move, thus giving the longer stroke for the third movement.

In Figs. 5 and 6 I have shown a way in which the cones may be separately delivered long enough to enable the attendant to replace imperfect cones before nesting the cones into "sticks" and putting the "sticks" into the boxes. I do this by providing a rod 77, having fingers 78 that project through a slot 79 in the trough way 80, and push the cones separately into the "stick". The rod 77 is elevated and lowered to raise and retract the fingers by levers 81 on slides 82 that are connected together at 83 and move on a slide way 84. The rod is raised and reciprocated lengthwise by a connecting rod 85, which is joined to the lever 5 and to the arm 86 of one of the levers 81. When this device is used, I can dispense with the exposure of the "stick" near the box and as soon as the stick is made up, put it directly into the box. To do this the slide 36 only is used and operating lever 25 is linked at 87 to the arm 45.

From the foregoing description taken in connection with the accompanying drawings, it is thought the complete construction, the manner of operation and the advantages of the invention will be clear to those skilled in the art to which it appertains.

What I claim is:

1. The combination with a cone receiving table, means for forming the cones into "sticks" on the table, a transverse box-conveyer, means for advancing the conveyer to aline the boxes with the receiving table, and mechanism for advancing the "sticks" along the table and into the boxes.

2. The combination with an adjustable cone receiving table, a relatively fixed-as-to-location box conveyer, means for advancing said conveyer to aline the boxes with the receiving table, table elevating mechanism for alining the exit end of the table with the respective cells of the boxes, and a device for pushing the cones from the table into the box.

3. The combination with a cone receiving table, means for advancing cones along the table from the entrant end toward the exit end in open or separated formation, and for subsequently nesting the cones into "sticks," a box conveyer, means for advancing the conveyer to aline the boxes with the receiving table, mechanism for moving the "sticks" off the table into the box.

4. The combination with a cone receiving table on to which the cones are delivered and nested in "sticks," a box conveyer means for advancing said conveyer to aline the boxes with the table, table elevating mechanism for alining the table with the box cells, a means for advancing cones in separated formation along the table to the place where they are nested.

5. The combination with a cone making machine, and of an apparatus for receiving the cones from the machine and boxing the same, said apparatus comprising a receiving table on to which the cones are discharged from the making machine, a conveying device to advance the cones along the table in open or separated formation and then nesting the same into a "stick," a box conveyer passing in juxtaposition to the table, and means for pushing the stick of cones off the table into the box.

6. The combination with a cone making machine, and of an apparatus for receiving the cones from the machine and boxing the same, said apparatus comprising a receiving table on to which the cones are discharged from the making machine, a conveying device to advance the cones along the table in open or separated formation and then nesting the same into a "stick," a box conveyer passing in juxtaposition to the table, and means for pushing the stick of cones off the table into the box and means for raising and lowering a portion of the table to aline the "sticks" with the respective cells or compartments of the boxes.

7. The combination with a cone receiving table, means for nesting the cones into "sticks" on the table, said table being hinged at its entrant end, a crank and pitman device connected with the exit end of the table for raising and lowering the same, a transverse box supporting table, a ratchet and pawl mechanism for operating said nesting table raising and lowering device to aline the exit end of the nesting table with the desired box cell, and a reciprocating device on the nesting table for advancing a "stick" of cones along the nesting table into the box.

8. The combination with a cone receiving table, means for nesting the cones into "sticks" on the table, said table being hinged at its entrant end, a crank and pitman device connected with the exit end of the table for raising and lowering the same, a transverse box supporting table, a ratchet and pawl mechanism for operating said nesting table raising and lowering device to aline the exit end of the nesting table with the desired box cell, a reciprocating device on the nesting table for advancing a "stick" of cones along the nesting table into the box, and a box advancing mechanism for advancing the boxes along the box supporting table.

9. The combination with a cone receiving table, means for nesting the cones into "sticks" on the table, said table being hinged at its entrant end, a crank and pitman device connected with the exit end of the table for raising and lowering the same, a transverse box supporting table, a ratchet and pawl mechanism for operating said nesting table raising and lowering mechanism to aline the exit end of the nesting table with the desired box cell, a reciprocating device on the nesting table for advancing a "stick" of cones along the nesting table into the box, a box advancing mechanism for advancing the boxes along the box supporting table, said mechanism being actuated through the action of said ratchet and pawl device.

10. In a mechanism of the class described, a nesting table onto which the cones are delivered from the cone making machine, means for nesting the cones into "sticks" on the table, means for advancing a predetermined "stick" of cones from the entrant toward the exit end of the table, a box table, means for advancing the boxes along the box table to aline with the nesting table, means for raising and lowering the nesting table to aline with the tiers of cells of the boxes, said cone "stick" advancing means having provision for moving the "sticks" of cones into the boxes substantially as shown and described.

11. In a mechanism of the class described, a nesting table onto which the cones are delivered from the cone making machine, means for nesting the cones into "sticks" on the table, means for advancing a predetermined "stick" of cones from the entrant toward the exit end of the table, a box table, means for advancing the boxes along the box table to aline with the nesting table, means for raising and lowering the nesting table to aline with the tiers of cells of the boxes, said cone "stick" advancing means having provision for moving the "sticks" of cones into the boxes, a pawl and ratchet device for operating the box advancing mechanism, a crank and lever device for operating the cone "stick" advancing mechanism, and a pawl and ratchet device for operating the nesting table adjusting mechanism.

12. The combination with a cone receiving table onto which the cones are delivered and nested into "sticks," a box conveyer, means advancing said conveyer to aline the boxes with the table, and means for advancing the cones in separated formation along the table to the place where they are nested.

13. The combination with a cone receiving table onto which the cones are delivered and nested onto "sticks," a box conveyer, means advancing said conveyer to aline the boxes with the table, means for advancing the cones in separated formation along the table to the place where they are nested, and means for moving the "stick" of cones off the table into the boxes.

FREDERICK A. BRUCKMAN.